UNITED STATES PATENT OFFICE.

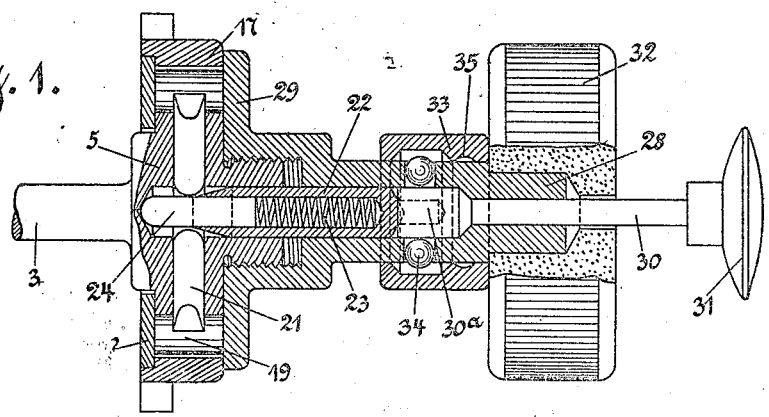
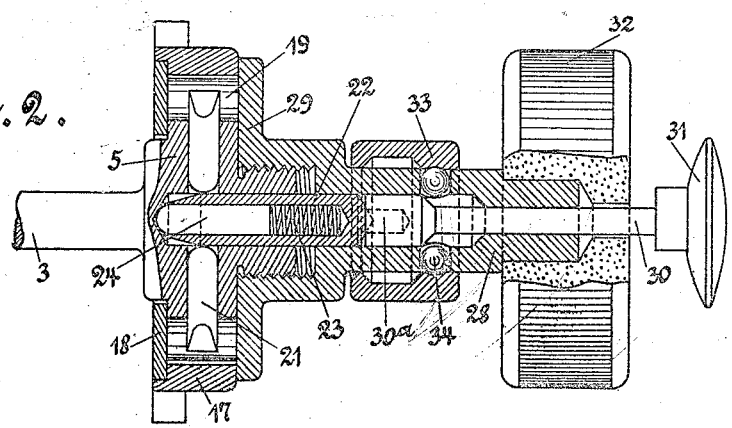
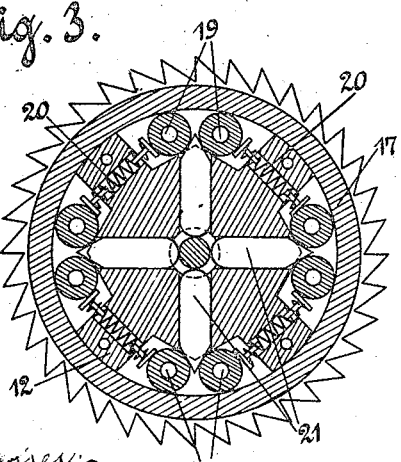
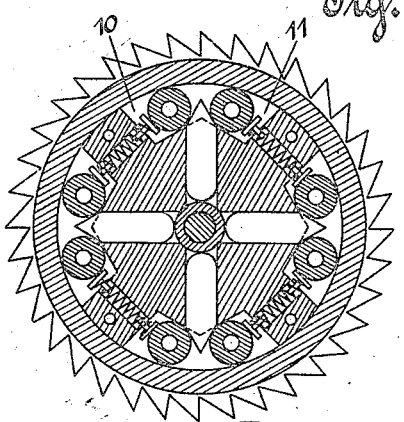

THEODOR EUGEN BUSCHMANN, OF CHEMNITZ, GERMANY, ASSIGNOR TO THE FIRM OF WANDERER-WERKE, VORM. WINKLHOFER & JAENICKE, AKT.-GES., OF CHEMNITZ, GERMANY.

MECHANISM FOR TYPE-WRITERS FOR COUPLING THE PAPER-CYLINDER TO THE LINE-SPACING WHEEL.

1,152,075.        Specification of Letters Patent.    Patented Aug. 31, 1915.

Application filed June 18, 1913. Serial No. 774,401.

*To all whom it may concern:*

Be it known that I, THEODOR EUGEN BUSCHMANN, mechanical engineer, a subject of the Emperor of Germany, and a resident of Chemnitz, Saxony, Germany, have invented certain new and useful Improvements in Mechanism for Type-Writers for Coupling the Paper-Cylinder to the Line-Spacing Wheel, of which the following is a specification.

This invention relates to a mechanism for typewriters for coupling the platen with the line-spacing wheel as described in my previous Letters Patent No. 993025 and has for its object to attain a further development of this mechanism by an arrangement by means of which the platen can be held uncoupled from the line-spacing wheel for any desired period without a permanent pressure on the pressure head of the uncoupling bolt being necessary.

One construction of the invention is illustrated by way of example in the accompanying drawings, in which:—

Figure 1 is a longitudinal section through a coupling mechanism in the operative position. Fig. 2 is a similar illustration but showing the line-spacing wheel uncoupled. Figs. 3 and 4 show the sections corresponding to Figs. 1 and 2.

3 is the platen axle which is formed in one piece with the carrier 5 for the clutch clamping rollers, in the form of construction being dealt with. In the periphery of this carrying body 5, oppositely directed clutch-roller cages 10 and 11 are milled out for receiving the clutch-rollers 19. The clutch-rollers 19 are provided with longitudinally directed holes and are thus similar in form to tubes, whereby resiliency is obtained. After milling out the previously mentioned cages 10 and 11, projections 12 remain on the periphery of the carrying body 5 through which projections holes are bored in which are guided spiral springs 20 which endeavor to press the clutch-rollers 19 against the inner wall of the annular line-spacing wheel 17. Further, in the carrying body 5 are bored radially-directed holes in which are guided wedge pins 21 which are arranged with their wedge-shaped points between each pair of clutch-rollers 19. Finally, the carrying body 5 is provided with a screwed projection on which is placed the hand-wheel pivot 28, which is provided with a flange 29, said flanges and a covering disk 18 arranged in the interior of the spacing wheel 17, inclose the clutch mechanism in the interior of the line-spacing wheel 17. The hand-wheel pivot 28 carries the hand-wheel 32 which is preferably knurled, said pivot being provided in its longitudinal direction with a hole which is pierced through by another radially drilled hole. In the longitudinal hole is guided the hollow bolt 22, which at its end forms a shallow cone and which, also, is provided with a longitudinal hole in which is located a compression spring 23 which presses against a pin 24 arranged in the carrying body 5 so that there is always an effort to press the hollow bolt 22 outward (*i. e.* toward the right in Figs. 1 and 2). Against this hollow bolt 22 operates the enlarged part $30^a$ of the shaft 30 which carries the pressure button 31. The shaft 30 may be enlarged to the part $30^a$ by means of a cone-shaped surface on which the clutch balls 34, which are arranged in the cross-bore of the handle pivot 28, may slide down. The handle pivot 28 is surrounded by a coupling sleeve 33 which at the same time prevents the falling out of the clutch balls 34. The sleeve 33 is further provided with a flat groove 35 (Fig. 1) in which enter the clutch balls 34 in order to prevent an unintentional movement of the sleeve (see Fig. 2).

The operation of the mechanism characterizing this invention is as follows: In the normal position the coupling sleeve 33 which surrounds the hand-wheel pivot is in the position shown in Fig. 1 so that, corresponding to my Patent No. 993025, the uncoupling can be effected by pressure on the button 31. When this button is released it is pushed back in a known manner by means of the spring 23. The coupling between the line-spacing wheel 17 and the carrying body 5 is effected by the action of a spring 20 which presses the clutch cylinders in the cages 10 and 11 against the inner wall of the line-spacing wheel 17. When the uncoupling bolt is pushed to the left by means of the button 31, shaft 30 and $30^a$, the cone at the end of this uncoupling bolt 22 presses the wedge pins 21 apart, thus causing the clutch-rollers 19 to be forced back into the cages against the action of the springs 20, so that the carrier 5, the clutch-rollers 19 and the inner wall of the line-spacing wheel 17 are no longer coupled together (see Fig. 4). If now it is desired to keep these parts uncoupled for a lengthened period, the sleeve 33 is pressed to the left. Thus it is effected that the locking balls 34 which can slide down on the cone-surface of a thickened part 30ᵃ of the pivot 30, slide into the cross-bore of the hand-wheel pivot and are held securely in their inner position so that the shaft 30 cannot return into its normal position when the button 31 is released, and thus the uncoupling bolt 22 is held, against the action of the spring 23 in its operative position as shown in Fig. 2.

I claim—

1. In a type-writer platen spacing mechanism, the combination with an annular spacing wheel, a carrier, clutch rollers, normally urged into clutching action, radially directed wedge-pins in said carrier to move the rollers out of clutching operation, a shaft having an enlargement for moving said wedge-pins and normally spring-urged out of engagement therewith, a hand wheel pivot secured to said carrier in which said shaft is longitudinally movable and having radial openings therein, means in said openings for engaging the shoulder formed by said enlargement and means for locking the aforesaid means in engaging position.

2. In a type-writer platen spacing mechanism, the combination with an annular spacing wheel, of a carrier, clutch rollers normally urged into clutching action, radially directed wedge-pins in said carrier to move the rollers out of clutching operation, a shaft having an enlargement for moving said wedge-pins and normally spring urged out of engagement therewith, a hand wheel pivot secured to said carrier in which said shaft is longitudinally movable, and having radial openings therein, balls in said openings for engaging the shoulder formed by said enlargement, and a sleeve for locking the aforesaid balls in engaging position.

3. In a type-writer platen spacing mechanism, a hollow hand wheel pivot, a hand wheel rigidly secured thereon, a spring urged shaft axially movable in said pivot and having a headed end on one side of said hand wheel, and an enlargement forming a shoulder, said pivot having radial openings, locking balls in said openings, a sleeve on said pivot having two internal grooves therein of different depths, one of said grooves engaging the balls and holding them in locking position against said shoulder and also operating to prevent the movement of the sleeve out of its locking position, and the other groove arranged to permit the balls to move out of locking position.

In testimony whereof I have affixed my signature.

THEODOR EUGEN BUSCHMANN.

In the presence of—
 EMIL STEGER,
 WALTER KOHLER.